(12) United States Patent
Selvasekar et al.

(10) Patent No.: US 10,814,804 B2
(45) Date of Patent: Oct. 27, 2020

(54) METHOD OF MANUFACTURING A COMPONENT WITH AT LEAST ONE EMBEDDED FEATURE

(71) Applicant: FORD GLOBAL TECHNOLOGIES, LLC, Dearborn, MI (US)

(72) Inventors: Siddharthan Selvasekar, Livermore, CA (US); Andres Almeida Senatore, Mountain View, CA (US); Daniel Boccuccia, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 15/826,234

(22) Filed: Nov. 29, 2017

(65) Prior Publication Data

US 2019/0161031 A1 May 30, 2019

(51) Int. Cl.
| | | |
|---|---|---|
| *B29C 70/88* | (2006.01) | |
| *G06F 17/40* | (2006.01) | |
| *B60R 16/02* | (2006.01) | |
| *B33Y 10/00* | (2015.01) | |
| *B33Y 80/00* | (2015.01) | |

(Continued)

(52) U.S. Cl.
CPC .......... *B60R 16/0215* (2013.01); *B29C 64/10* (2017.08); *B29C 64/106* (2017.08); *B29C 64/112* (2017.08); *B29C 64/118* (2017.08); *B33Y 10/00* (2014.12); *B33Y 80/00* (2014.12); *B60H 1/00564* (2013.01); *B60K 37/00* (2013.01); *B60R 13/02* (2013.01); *B29C 70/68* (2013.01); *B29L 2031/30* (2013.01); *B29L 2031/3005* (2013.01);

(Continued)

(58) Field of Classification Search
CPC ..... B29C 64/10; B29C 64/106; B29C 64/112; B29C 64/118; B29C 70/68; B29C 70/88; B29L 2031/30; B29L 2031/3005; B29L 2031/3008; B33Y 10/00; B33Y 50/00; B33Y 50/02; B33Y 80/00; B60Y 2410/12; B60Y 2410/122; G06F 17/40; G06F 2113/10
USPC ...... 264/104, 272.11, 272.15, 308; 29/527.1, 29/897.2; 703/1
See application file for complete search history.

(56) References Cited

U.S. PATENT DOCUMENTS

| | | |
|---|---|---|
| 5,897,155 A | 4/1999 | Kerner et al. |
| 7,396,062 B2 | 7/2008 | Hung et al. |

(Continued)

OTHER PUBLICATIONS

"3D Printed Car: Center Console, Steering Column, & Glove Compartment"; LM Labs; https://launchforth.io/GeorgieBlue/3d-printed-car-center-console-steering-column-glove-compartment/; pp. 1-5, (Jul. 2014).

(Continued)

*Primary Examiner* — Leo B Tentoni
(74) *Attorney, Agent, or Firm* — David Coppiellie; King & Schickli, PLLC

(57) ABSTRACT

A method of manufacturing a component with at least one embedded feature includes the steps of defining a boundary template for the component, reserving a functional region within the boundary template for the at least one embedded feature, consolidating and structurally optimizing the component to allow more efficient distribution of material and manufacturing the component using additive manufacturing techniques. A motor vehicle component including a motor vehicle center console are also disclosed.

12 Claims, 9 Drawing Sheets

(51) Int. Cl.
    *B29C 64/10*     (2017.01)
    *B60K 37/00*     (2006.01)
    *B60H 1/00*     (2006.01)
    *B60R 13/02*     (2006.01)
    *B29C 64/112*     (2017.01)
    *B29C 64/106*     (2017.01)
    *B29C 64/118*     (2017.01)
    *B29L 31/30*     (2006.01)
    *B29C 70/68*     (2006.01)
    *G06F 113/10*     (2020.01)

(52) U.S. Cl.
    CPC ... *B29L 2031/3008* (2013.01); *B60K 2370/60* (2019.05); *B60Y 2410/12* (2013.01); *B60Y 2410/122* (2013.01); *G06F 2113/10* (2020.01)

(56) References Cited

U.S. PATENT DOCUMENTS 9,308,871 B2     4/2016     Winklbauer
2005/0266789 A1*   12/2005   Hier ........................ B60H 1/247
                                                                                454/152
2009/0173443 A1*   7/2009   Kozlak ................ B29C 64/106
                                                                                156/303.1
2013/0229323 A1*   9/2013   Lee ...................... H01Q 21/0006
                                                                                343/905
2015/0073262 A1*   3/2015   Roth ...................... A61B 5/1077
                                                                                600/411
2016/0075290 A1    3/2016   Catlin
2016/0198576 A1*   7/2016   Lewis .................... B33Y 80/00
                                                                           264/272.11 X
2016/0288401 A1   10/2016   Sturany

OTHER PUBLICATIONS

Cunningham, Victor et al; "Navy Additive Manufacturing: Adding Parts, Subtracting Steps"; U.S. Department of Defense, Defense Technical Information Center, Naval Postgraduate School; http://www.dtic.mil/docs/citations/ADA632470; Jun. 2015; pp. 1-97; Monterey, CA.

* cited by examiner

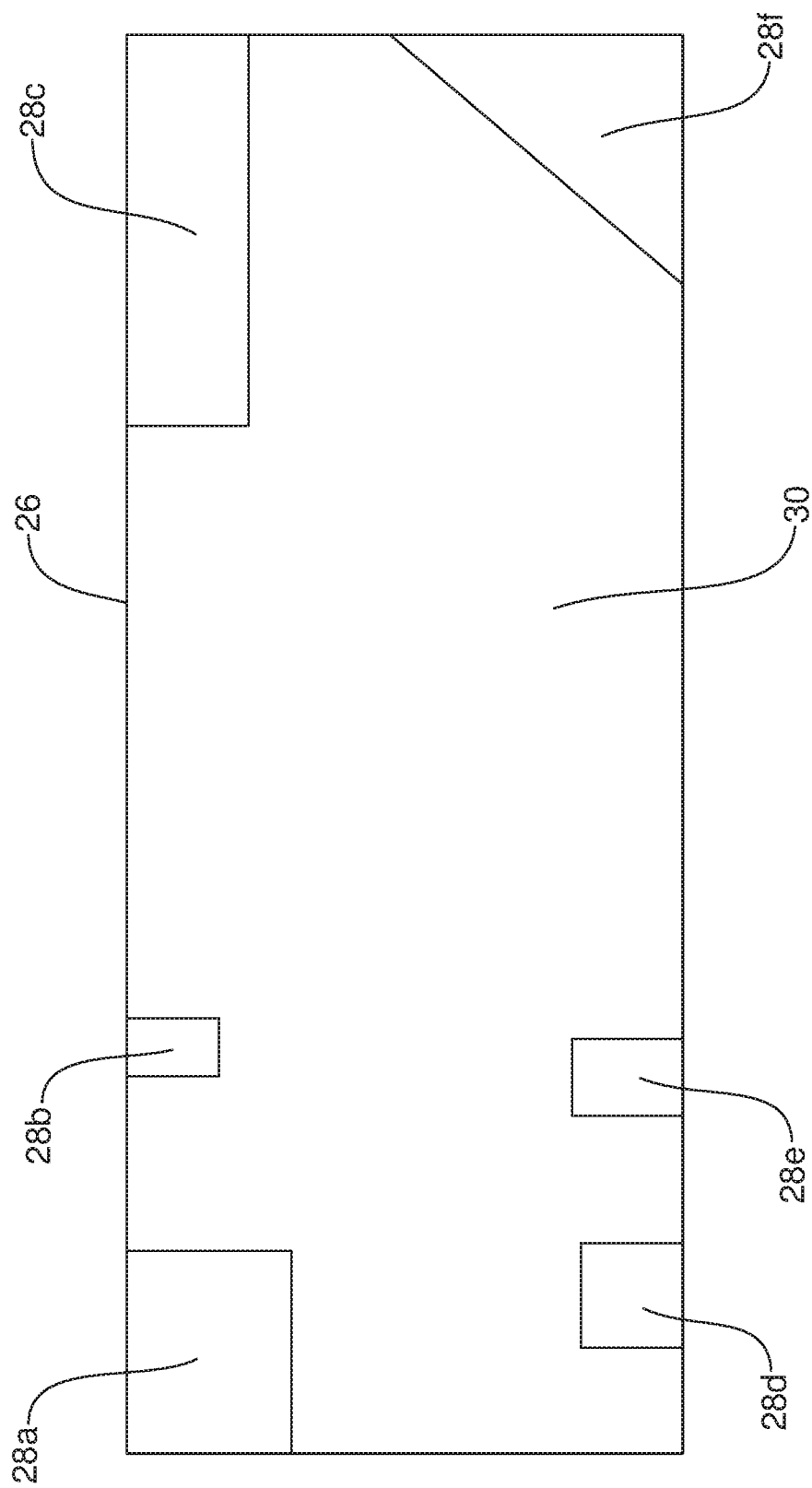

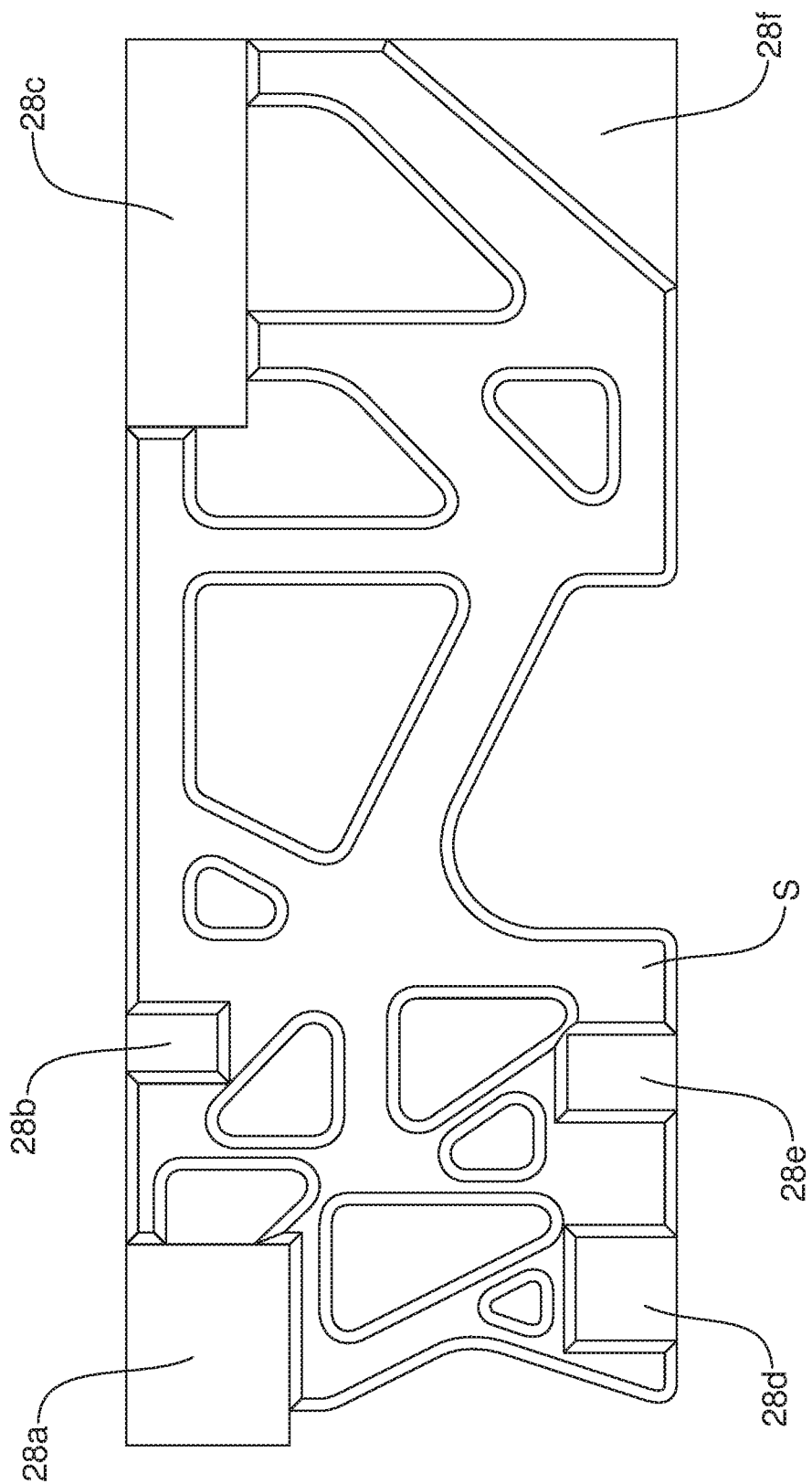

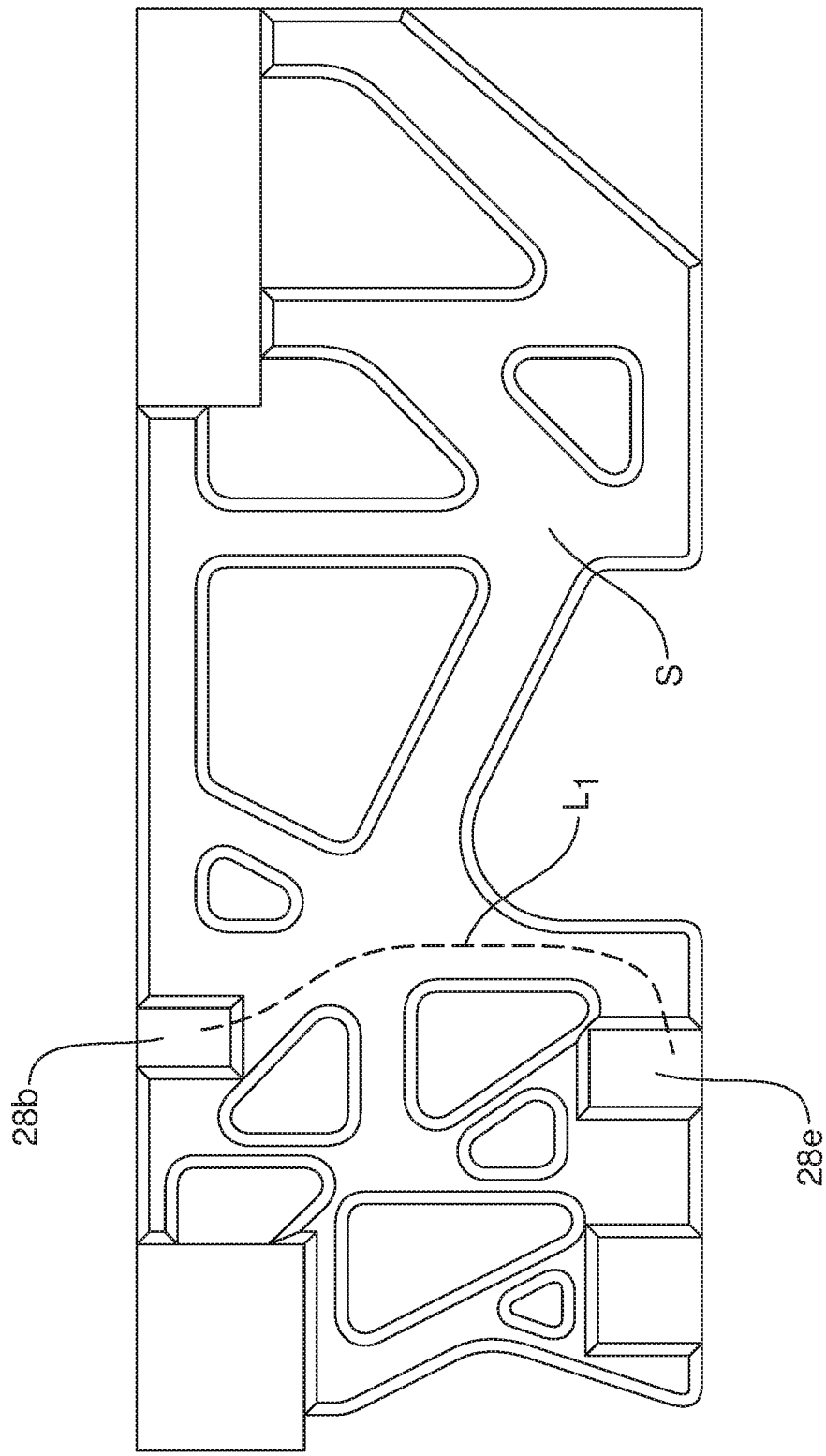

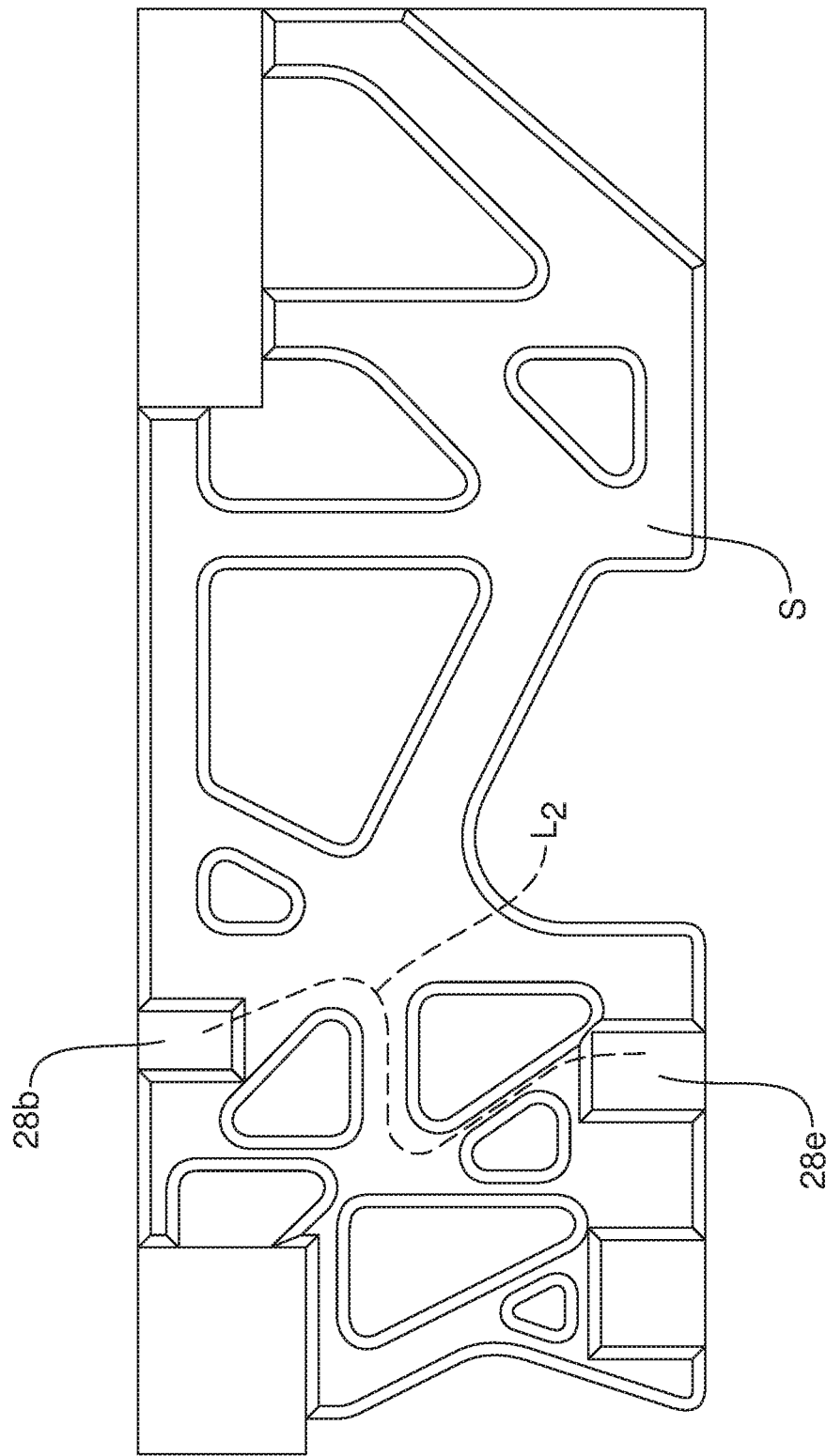

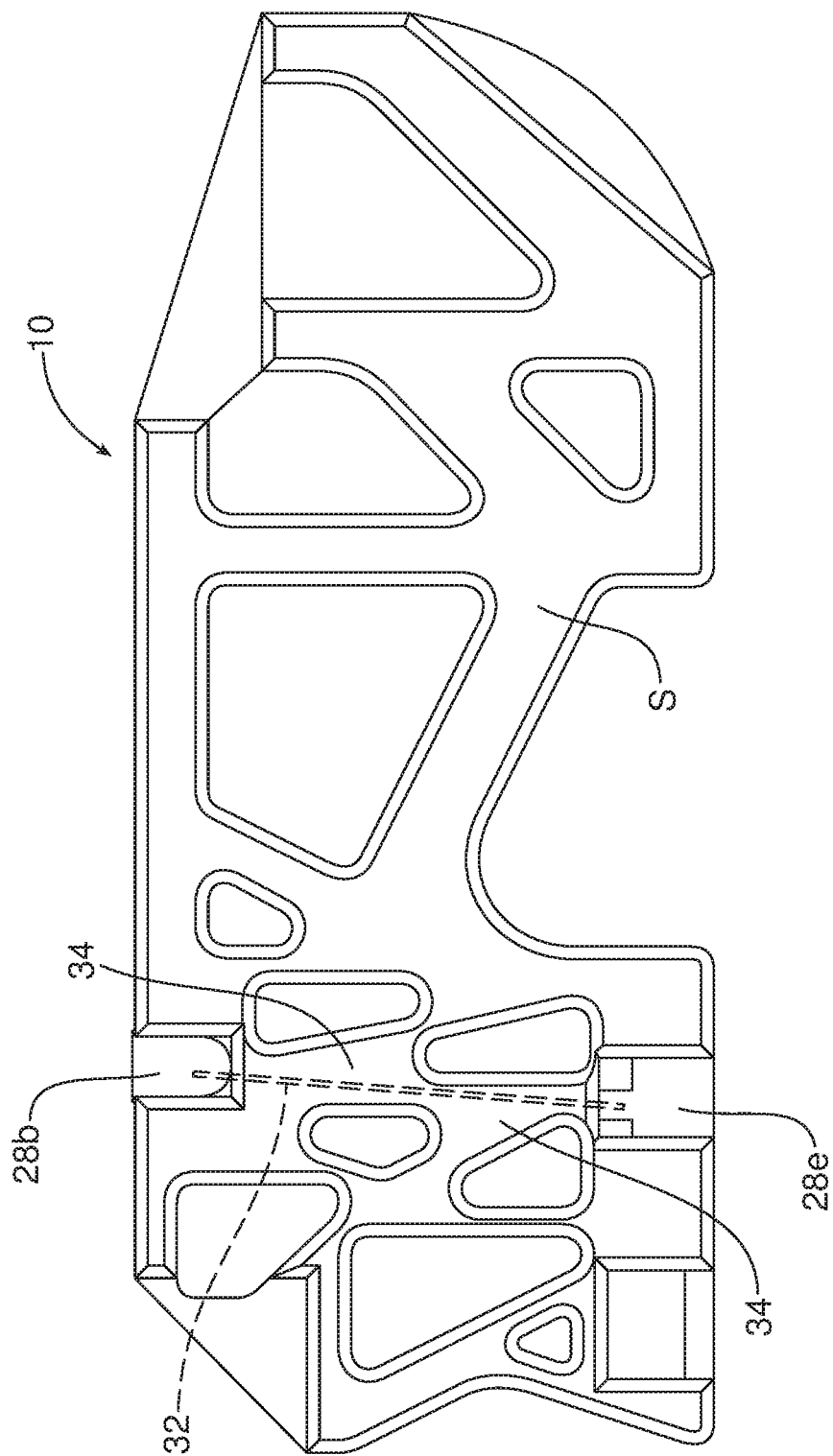

METHOD OF MANUFACTURING A COMPONENT WITH AT LEAST ONE EMBEDDED FEATURE

TECHNICAL FIELD

This document relates generally to the field of additive manufacturing and, more particularly, to a method of manufacturing a component with at least one embedded feature as well as to such a component for a motor vehicle.

BACKGROUND

Many manufactured components incorporate one or more embedded features and are not optimized for weight and efficiency of production. For example, a motor vehicle center console may incorporate multiple embedded features such as system routing features (i.e. (a) electrical wiring, (b) heating, ventilating and air conditioning system duct work, (c) an electronic module, (d) antenna). Such embedded features require additional components and assembly. As a result, center consoles incorporating embedded features are often bulky and over designed. Such center consoles may contain excess mass.

This document relates to a new and improved method of manufacturing such a component. That method utilizes and leverages the unique ability of additive manufacturing to enable a more efficient and lightweight design with a lower part count and simpler assembly.

SUMMARY

In accordance with the purposes and benefits described herein, a method for manufacturing a component with at least one embedded feature is provided. That method comprises the steps of: (a) defining a boundary template for the component, (b) reserving an accommodation space or a functional region within the boundary template for the at least one embedded feature, (c) consolidating and structurally optimizing the component to allow more efficient distribution of material during manufacture of the component and (d) manufacturing the component using additive manufacturing techniques.

The consolidating and structurally optimizing step may include the step of completing, by computer device, statistical analysis between all possible structural variations of the component while considering all the different non-design spaces for the most efficient path for the embedded system. Further, the step of consolidating and structurally optimizing may include the step of executing a design modification to achieve a final solution following statistical analysis.

The method may also include the step of routing the electrical wiring through the component. In addition, the method may include the step of embedding the electrical wiring in the material of the component.

In some embodiments, the method may include the step of routing duct work through the component. Further, the method may include the step of embedding that duct work in the material of the component. In still other embodiments the method may include the step of manufacturing that duct work within the component using additive manufacturing techniques.

In one or more of the many possible embodiments the method may include reserving the functional region for an electronic module. In addition, the method may include embedding that electronic module in the material of the component.

In still other possible embodiments, the method may include the step of reserving the functional region for an antenna. Further, the method may include embedding that antenna in the material of the component.

In at least one of the many possible embodiments, the method may include manufacturing duct work within the component using additive manufacturing techniques.

In one or more of the many possible embodiments, the component may be a motor vehicle component. Thus, the component may comprise a console. In other embodiments the component may comprise an instrument panel. In still other embodiments, the component may comprise a seat frame and trim. In still other possible embodiments, the component may comprise a door trim panel. In still other possible embodiments, the component may comprise a pillar trim. In still other possible embodiments, the component may comprise an overhead console. In still other possible embodiments, the component may comprise a scuff plate. In other possible embodiments, the component may comprise a package tray. Further, the component may comprise a combination of any of these structures.

In accordance with an additional aspect, a motor vehicle component is provided. That motor vehicle component comprises a body made by additive manufacturing and a system routing feature embedded in the body. In one or more of the many possible embodiments, the system's routing feature may comprise an air duct. In one or more of the many possible embodiments, the system routing feature may comprise electrical wiring. In one or more embodiments, the system routing feature may also be made by additive manufacturing.

In accordance with yet another aspect, a motor vehicle center console is provided. That motor vehicle center console comprises a body and a system routing feature both made by additive manufacturing. The system routing feature may comprise duct work for a heating, ventilating and air conditioning system of the motor vehicle.

In the following description, there are shown and described several preferred embodiments of the method of manufacturing a component with at least one embedded feature and the component so manufactured. As it should be realized, the method and component are capable of other, different embodiments and their several details are capable of modification in various, obvious aspects all without departing from the system and component as set forth and described in the following claims. Accordingly, the drawings and descriptions should be regarded as illustrative in nature and not as restrictive.

DETAILED DESCRIPTION

The accompanying drawing figures incorporated herein and forming a part of the specification, illustrate several aspects of the method and the component and together with the description serve to explain certain principles thereof.

FIGS. 2-7 are a series of views schematically illustrating the method of manufacturing a component with at least one embedded feature. More specifically:

FIG. 2 illustrates the step of defining or establishing a footprint for the component.

Figure 3:
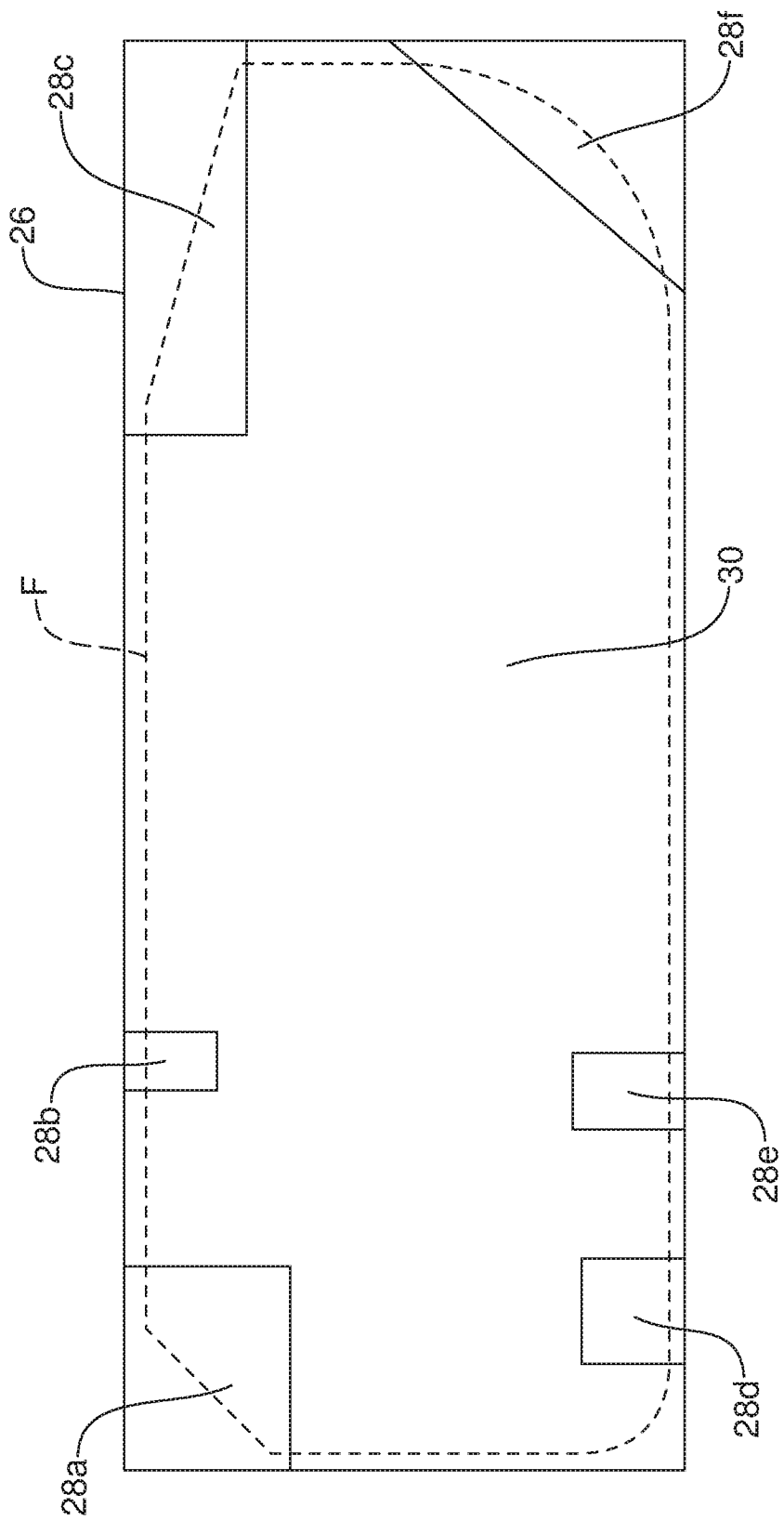

FIG. 3 schematically illustrates the steps of defining or establishing a boundary template for the component and reserving functional regions within the boundary template for necessary features or other requirements.

FIG. 4 schematically illustrates the frozen regions for the various embedded features and the area of the component to be consolidated and structurally optimized to allow more efficient distribution of material during manufacturing of the component.

FIG. 5 illustrates a first iteration result for the structural optimization of the component.

FIG. 6a illustrates one possible route for embedded electrical wiring considering the optimization results of FIG. 5.

FIG. 6b illustrates a second possible route for embedded electrical wiring considering the optimization result of FIG. 5.

Figure 6C:
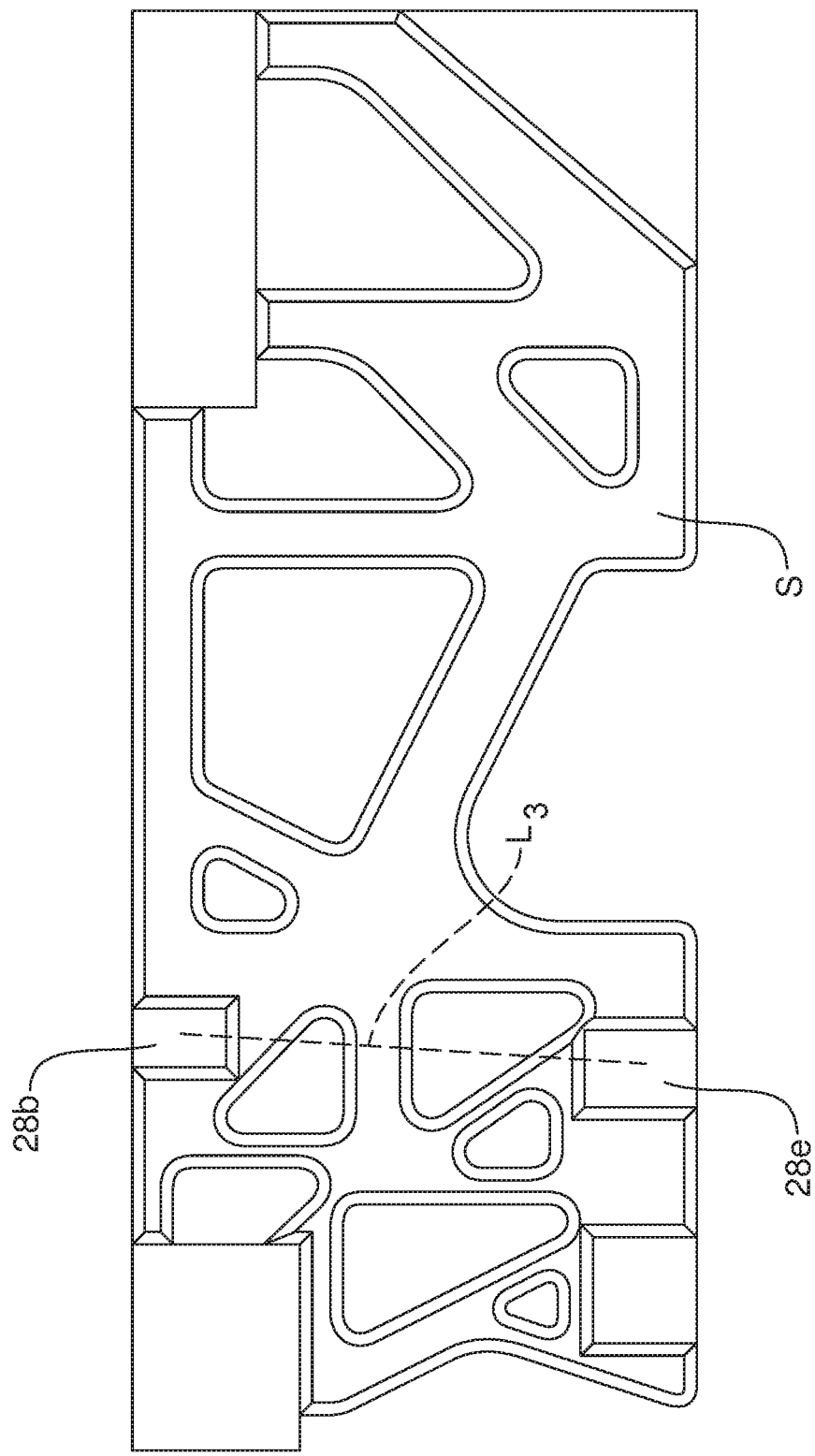

FIG. 6c illustrates the shortest route for embedded electrical wiring regardless of the optimization result illustrated in FIG. 5.

FIG. 7 illustrates the step of manufacturing the component using additive manufacturing techniques.

Reference will now be made in detail to the present preferred embodiments of the method of manufacturing a component with at least one embedded feature and the component, examples of which are illustrated in the accompanying drawing figures.

DETAILED DESCRIPTION

Figure 1:
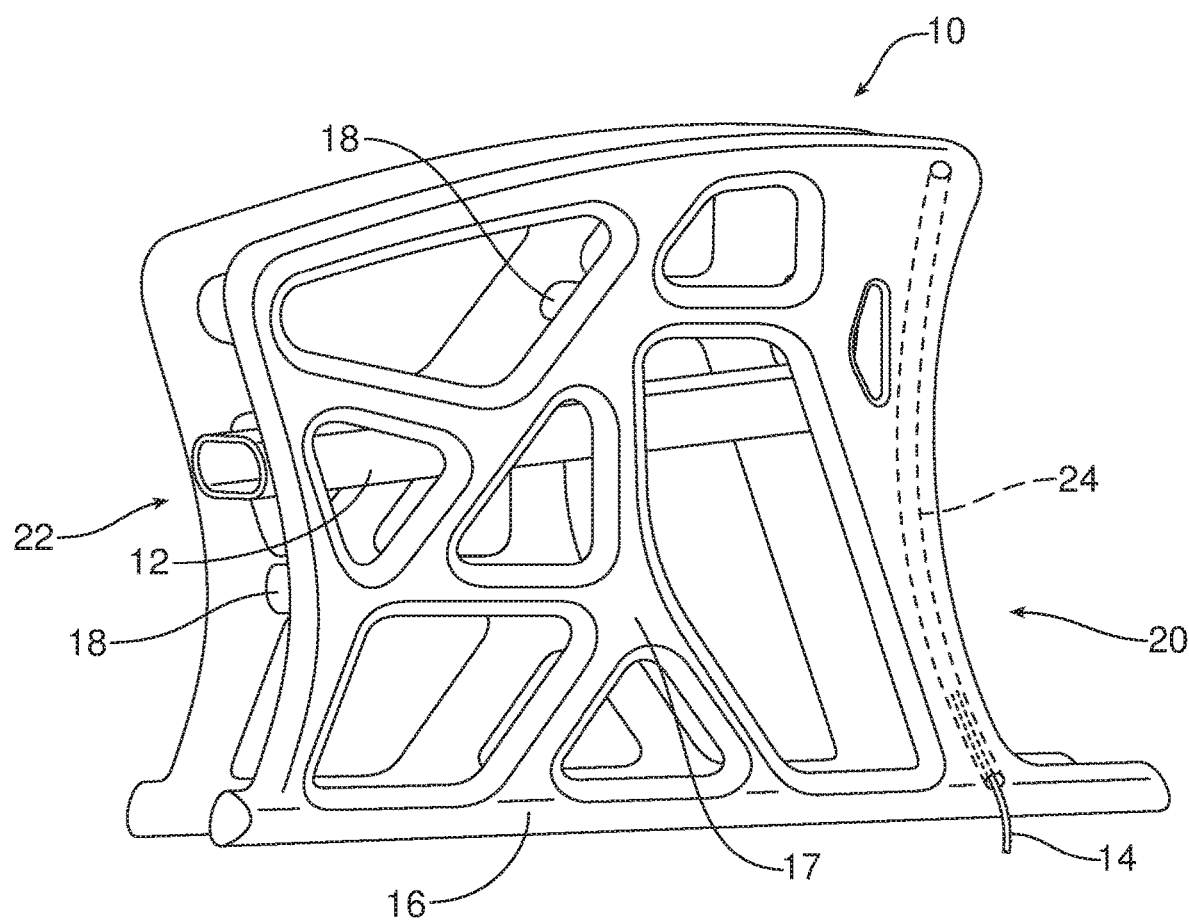
FIG. 1 is a perspective view of a component, in the form of a motor vehicle center console, incorporating two different embedded features.

Reference is now made to FIG. 1 illustrating a component 10 made utilizing the new and improved method of manufacturing that component with at least one embedded feature generally designated by reference numerals 12 and 14. More specifically, in the illustrated embodiment the component 10 comprises a motor vehicle center console, the embedded feature 12 comprises duct work for a heating, ventilation, air conditioning (HVAC) system of a motor vehicle and the embedded feature 14 comprises electrical wiring.

The motor vehicle component 10 includes a body 16 made by additive manufacturing. The embedded features 12, 14 are system routing features that are embedded in the body 16. Still more specifically, the body 16 comprises a lattice work of sidewalls 17 and ribs 18. The embedded feature/duct work 12 passes through at least some of the ribs 18 extending from a forward end 20 of the component 10 to a rearward end 22 of the component. In some embodiments of the component 10, the ribs 18 are made with openings to receive a subsequently installed section of duct work 12. In other possible embodiments, the embedded feature/duct work 12 is also made by additive manufacturing simultaneously with the making of the body 16.

The embedded feature/electrical wiring 14 of the illustrated component 10 is received in a slot or channel 24 formed in a sidewall 17 of the component 10 and specifically dedicated for this purpose at the time of the design of the component.

Figure 2:

Reference is now made to FIGS. 2-5, 6a-6c and 7 which schematically illustrate the new and improved method of manufacturing a component 10 such as the motor vehicle center console illustrated in FIG. 1. That method includes the step of defining a boundary template 26 for the component 10. See FIG. 2 illustrating the footprint F for the component 10 as viewed from above and FIG. 3 illustrating the boundary template 26 from above. While FIGS. 2 and 3 are a two-dimensional representation of the component 10 and the boundary template 26, it should be appreciated that the component and boundary template are three-dimensional with the boundary template defining the outer design boundary for the component.

Next is the step of reserving accommodation spaces or functional regions 28a-28f within the boundary template 26 for each of the embedded features (not shown). FIG. 4 illustrates the frozen regions or reserved functional regions 28a-28f as well as the area 30 of the component 10 to be structurally optimized. Examples of functional regions 28a-28f may include, but not limited to, attachment locations, clearance zones, storage space and customer-facing features.

Next the method includes the step of consolidating and structurally optimizing the component 10 to allow for more efficient distribution of material during manufacturing of the component. Consolidating and structurally optimizing the component includes completing, by computing device, statistical analysis between all possible structural variations of the component. This produces a first iteration result or design for the component 10 including a lattice or rib structure S as illustrated in FIG. 5 stretching across the area to be optimized 30 while avoiding the frozen regions or functional regions 28a-28f.

Consolidating and structurally optimizing the component 10 further includes the step of executing a design modification to achieve a final solution following statistical analysis. Thus, as illustrated in FIGS. 6a and 6b the method may include routing wiring through the component 10 between the wiring inlets/outlets 28b and 28e. As illustrated in FIGS. 6a and 6b, two potential wiring routes are indicated by the dashed lines $L_1$ and $L_2$. In contrast, FIG. 6c illustrates the shortest route $L_3$ for any embedded wiring passing through the component 10 between the inlet/outlets/28b, 28e regardless of the structure of the first iteration.

After statistical analysis is performed between all possible variations, the method may include executing a design modification to achieve a final solution following statistical analysis. Thus, as illustrated in FIG. 7, the lattice or rib structure S between functional regions 28b and 28e is modified to accommodate the embedded wiring across the component 10 between the inlet/outlets 28b, 28e in accordance with the shortest route. In order to achieve this result, the method further includes embedding the wiring 32 in the ribs 34 extending between the input/outputs 28b, 28e.

FIGS. 2-7 illustrate a component 10 wherein the embedded feature is wiring 32. Here it should be appreciated that the embedded feature may take a number of other forms including, but not necessarily limited to, duct work, electronic modules and/or antennae. Where the embedded feature is duct work, the method may include the steps of reserving a functional region for the duct work, routing the duct work through the component 10 and finally embedding the duct work in the material of the component.

In some embodiments, the method may include the step of actually manufacturing the duct work within the component 10 using additive manufacturing techniques. Thus, the duct work may be generated during the process of manufacturing the optimized structure for the component.

Where the embedded feature is an electronic module, the method may include the steps of reserving the functional region for the electronic module, and embedding the electronic module in the material of the component.

Where the embedded feature is an antenna, the method may include the steps of reserving the functional region for an antenna and embedding the antenna in the material of the component. Where the antenna includes a cable connection, the method would also include the steps of routing the cable through the component 10 and embedding the cable in the material of the component.

As described above, the component 10 may be a motor vehicle component. That motor vehicle component may be selected from a group of components consisting of a console, an instrument panel, a seat frame and trim, a door trim panel, a pillar trim, an overhead console, a scuff plate, a package tray and combinations thereof. Further, it should be noted that this listing of components is presented for purposes of illustration and should not be considered as being restrictive in scope.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method of manufacturing a component with at least one embedded feature, comprising:
    defining a boundary template for said component;
    reserving a functional region within said boundary template for said at least one embedded feature;
    consolidating and structurally optimizing said component to allow more efficient distribution of material during manufacturing of said component wherein said consolidating and structurally optimizing includes completing, by computing device, statistical analysis between multiple possible structural variations of the component to be manufactured and executing a design modification to achieve final solution following statistical analysis to achieve a more efficient distribution of material during manufacture and to better accommodate the at least one embedded feature; and
    manufacturing said component using additive manufacturing techniques.

2. The method of claim 1, including routing electrical wiring through said component.

3. The method of claim 2, including embedding said electrical wiring in said material of said component.

4. The method of claim 1, including routing duct work through said component.

5. The method of claim 4, including embedding said duct work in said material of said component.

6. The method of claim 1, including reserving said functional region for an electronic module.

7. The method of claim 6, including embedding said electronic module in said material of said component.

8. The method of claim 1, including reserving said functional region for an antenna.

9. The method of claim 8, including embedding said antenna in said material of said component.

10. The method of claim 4, including manufacturing duct work within said component using additive manufacturing techniques.

11. The method of claim 1, wherein said component is a motor vehicle component.

12. The method of claim 1, wherein said component is selected from a group of components consisting of a console, an instrument panel, a seat frame and trim, a door trim panel, a pillar trim, an overhead console, a scuff plate, a package tray and combinations thereof.

* * * * *